Figure 4:
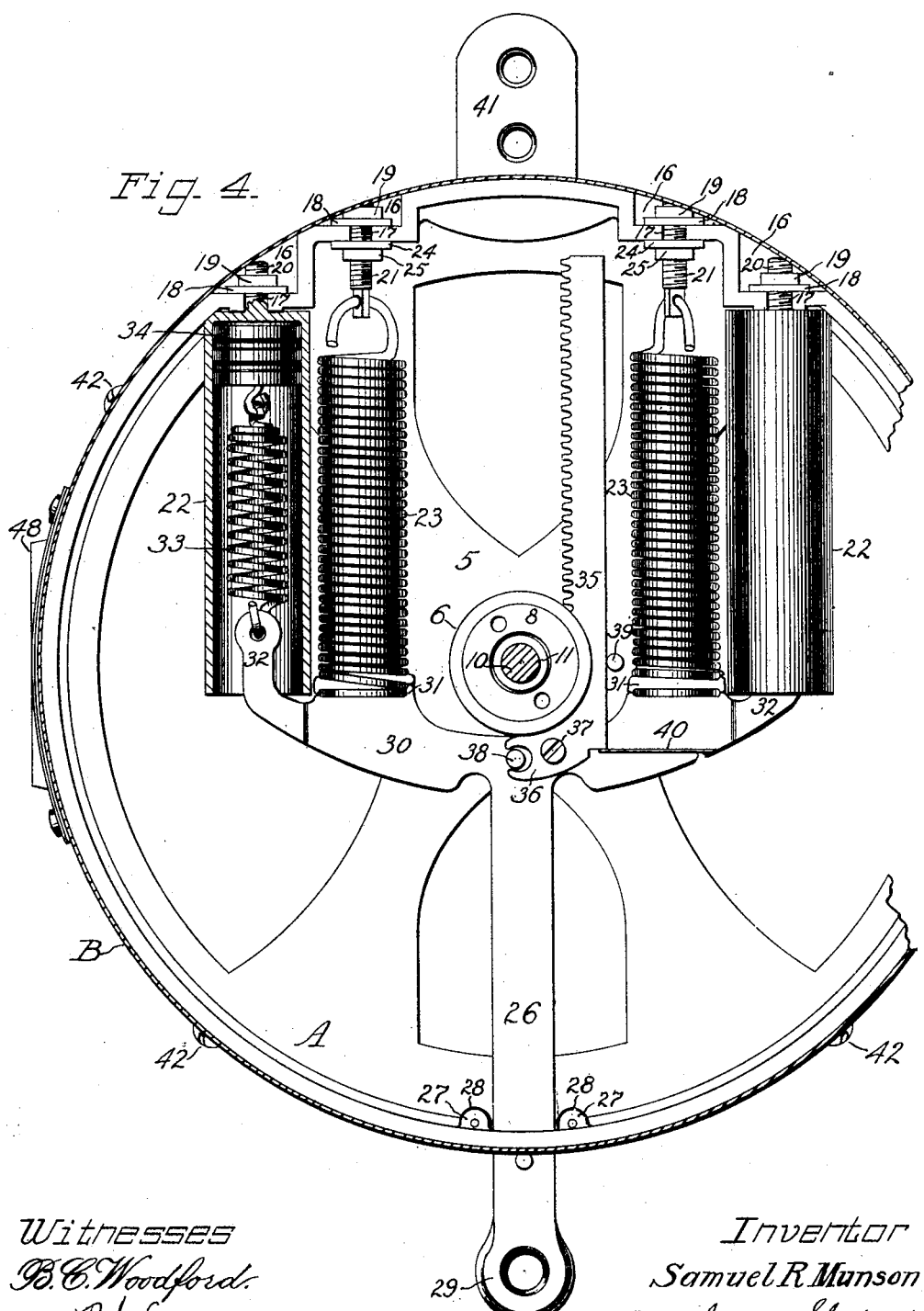

No. 673,279. Patented Apr. 30, 1901.
S. R. MUNSON.
COMPUTING SCALE.
(Application filed Oct. 6, 1900.)
(No Model.) 2 Sheets—Sheet 1.
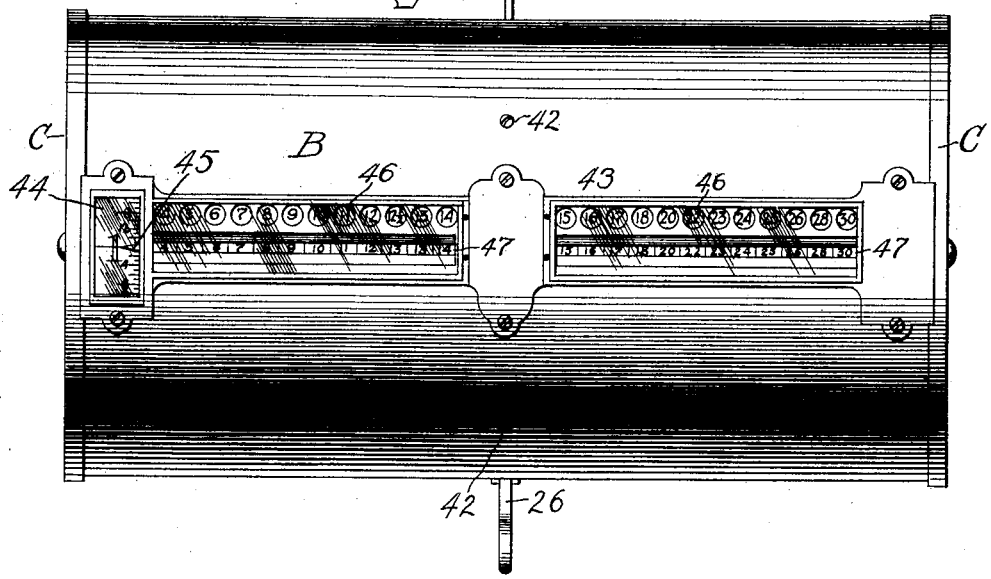
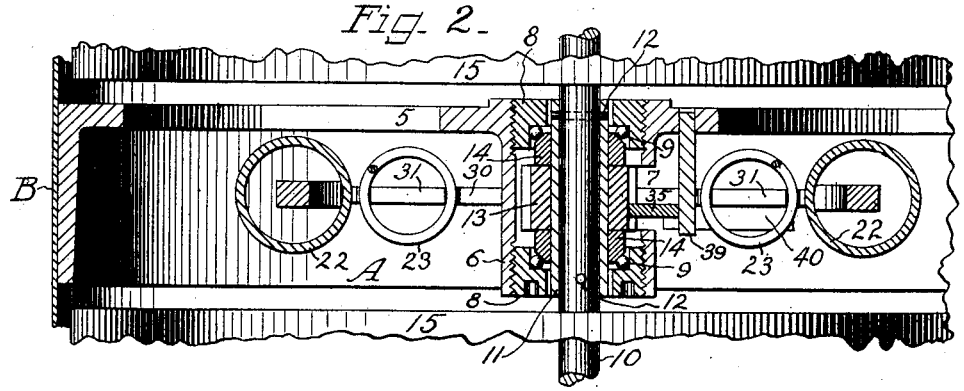
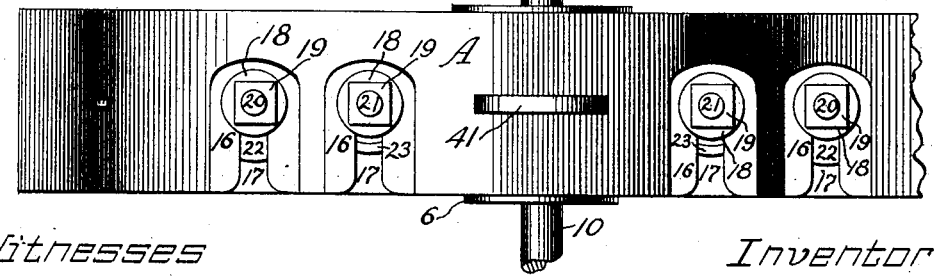
Witnesses
B. C. Woodford.
P. J. Egan.
Inventor
Samuel R. Munson.
By James Shepard
Atty.
THE NORRIS PETERS CO., PHOTO-LITHO., WASHINGTON, D. C.

No. 673,279. Patented Apr. 30, 1901.
S. R. MUNSON.
COMPUTING SCALE.
(Application filed Oct. 6, 1900.)

(No Model.) 2 Sheets—Sheet 2.

Witnesses
B. C. Woodford.
P. J. Egan.

Inventor
Samuel R. Munson
By James Shepard
Atty.

UNITED STATES PATENT OFFICE.

SAMUEL R. MUNSON, OF NEW BRITAIN, CONNECTICUT, ASSIGNOR TO THE LANDERS, FRARY AND CLARK, OF SAME PLACE.

COMPUTING-SCALE.

SPECIFICATION forming part of Letters Patent No. 673,279, dated April 30, 1901.

Application filed October 6, 1900. Serial No. 32,271. (No model.)

*To all whom it may concern:*

Be it known that I, SAMUEL R. MUNSON, a citizen of the United States, residing at New Britain, in the county of Hartford and State of Connecticut, have invented certain new and useful Improvements in Computing-Scales, of which the following is a specification.

My invention relates to improvements in computing or price scales; and the main object of my improvement is to provide simple and effective means for checking the vibration of the cylinder; and in general the object is simplicity and economy in construction and efficiency in operation.

In the accompanying drawings, Figure 1 is a front elevation of my scale with the cylinder in a position to indicate one pound. Fig. 2 is an enlarged central and horizontal section of the middle portion of my scale, some of the parts being shown in plan view. Fig. 3 is a plan view of the main portion of the frame and portion of the cylinder-shaft, the case and cylinders being removed. Fig. 4 is a sectional side elevation of the frame at the middle and connected parts, the case being in vertical section on a line to the left of the middle of Fig. 1, while one of the air-cylinders is shown in central vertical section.

The scale herein shown and described is constructed partly in accordance with the invention shown, described, and claimed in my application, Serial No. 1,661, filed January 16, 1900, and therefore all those features which are common to both applications are not of themselves claimed in this application.

A is the frame, having a ring-shaped rim and a web 5 extending transversely across the said rim, all of the scale being mounted on and supported by the said frame. In the center of the web 5 is the bearing-case or hub 6, cut away or slotted, as at 7, Fig. 2, on its front side to admit the rack and interiorly threaded at each end to receive the bearing-rings 8. These rings are exteriorly threaded and have formed on their interior the track or bearing-faces for the series of antifriction-balls 9.

For convenience and economy in construction I make the cylinder-shaft 10 in the form of a straight rod or shaft of a uniform diameter from end to end. At the middle of its length I rigidly secure a tube or collar 11 about as long as the length of the bearing-case 6, the said tube being fastened in any proper manner—as, for example, by pins 12—so as to practically form a shaft with an enlargement at its middle portion. Upon this enlargement I drive the pinion 13 and the two rings or cones 14, one at each end of the pinion, for forming the other track or bearing for the series of antifriction-balls. By this construction the pinion may be of brass and the rings or cones of hardened steel, and the friction of the said parts on the tube or enlargement of the shaft is all that is necessary to hold them in place. The combined shaft, pinion, and rings or cones is inserted in the bearing-case before both of the bearing-rings are secured therein, where the said shaft is secured by means of the said bearing-rings 8 8, which can be screwed in so as to properly adjust the bearings to the series of balls. The ends of the shaft 10 are supplied with indicating-cylinders 15 of any desired construction, portions of the said cylinders being shown in Figs. 1 and 2.

In the upper part of the rim of the frame A there are four flat-bottomed recesses 16, with open slots 17 extending from about the middle of the said rim to the left-hand edge thereof—that is, the edge which is farthest from the transverse web 5—which recesses and slots are to receive the washers 18, nuts 19, and screws 20 and 21, by which to secure to the frame the air-cylinders 22 and the balancing-springs 23. The lower ends of the screws 21 are provided with eyes by which to connect the springs 23 and also with washers 24 and nuts 25 to act in opposition to the washers and nuts at their upper ends. The screws 20 are made rigid with the upper ends of the cylinders 22, which ends act in opposition to the washers and nuts within the recesses 16 of the frame, whereby the said cylinders are rigidly held in place on the said frame in front and rear of the springs 23 and all substantially in one plane that extends transversely to the rim of the frame A. In the lower part of the frame there is an opening through which the draw-bar 26 extends, and by the front and rear side of which bar are lugs 27, in which to mount friction-rollers 28 for bearing on the front and rear edges of the draw-bar 26. The lower end of the draw-bar is provided with an eye 29 as an ordinary provision for connecting an ordinary scale-pan thereto. At the upper end of the draw-bar there is a cross-head 30, having toward each end upwardly-projecting lugs 31, to which the lower ends of the springs 23 are connected, and at the ends of the cross-head is an eye or lug 32 for connecting the lower end of a spiral spring 33 within the air-cylinders 22, to the upper ends of which springs the pistons 34 of the said cylinders are mounted, whereby the said springs 33 constitute resilient or yielding and elastic piston-rods. The rack 35 for engaging the pinion on the cylinder-shaft is provided with a short arm 36 at its lower end and is pivoted to the cross-head 30 by means of the screw 37. The end of the short arm 36 is slotted, as shown in Fig. 4, and a pin 38 on the cross-head and within the slot of the said arm serves to limit the movement of the rack-bar on its pivoted screw 37. A pin or stud 39 on the web 5 of the frame prevents the teeth of the rack from disengaging those of the pinion, while a spring 40 on the cross-head 30, bearing on the heel of the rack, also tends to hold it in engagement with the pinion. A lug 41 in the upper part of the frame A furnishes suitable means for hanging the scales to any proper support.

The cylinders and frame are inclosed by a cylindrical case B, having end plates C, Fig. 1, which case is secured to the frame by screws 42. The said case may be provided with any desired form of openings and the case and cylinder provided with any ordinary or desired marks, graduations, and figures. As shown in Fig. 1, a long escutcheon 43 extends substantially the whole length of the case, the openings in which escutcheon may be covered with glass. At the left-hand end there is a rectangular opening 44, having a finger or index 45 at its middle on the right-hand side, through which opening the pounds and ounces are read. At the upper part of the escutcheon there is a series of circular holes 46, through which figures on the case may be seen to indicate the different prices per pound. Longitudinally of the escutcheon there is a long narrow slot 47, one for the cylinder at each end, through which the amount at any given price per pound is read. The escutcheon 48 (shown at the left in Fig. 4) is for a rectangular opening on the rear side of the scale similar to the rectangular opening 44 at the front, but on the diagonally opposite corner, through which escutcheon 48 the customer may read the weight in pounds and ounces.

The pistons 34 are fitted so as to slide easily in the longitudinal direction of the cylinder. The springs 33, that form the preferred form of resilient piston-rod, are tempered springs set a little open and are of such length as to carry the pistons nearly to the upper end of the cylinders when the scale is in its normal position at the zero-mark. The springs are stiff enough to move the pistons without any perceptible deflection of the springs when the cross-head and connected parts are moved down squarely and slowly; but if the cross-head is moved down or up quickly they permit the cross-head to move faster than the piston, but in the end to move down the same distance when the scale-pan is at rest. As a matter of convenience in attaching the resilient piston-rods to the piston and draw-bar, I have shown what may be called a "hook-and-eye connection," which incidentally constitutes a jointed connection; but it should be noted that I depend on the resiliency of the piston-rod itself rather than the jointed connections to prevent binding of the piston within the cylinder. The springs 33 of themselves effectively prevent the piston from ever being so moved as to bind within the cylinder. The effect of the cylinders and pistons is to make the cylinder come quickly to rest with but little vibration.

By means of the peculiar frame and having the cross-head cylinders and springs 23 all in one plane with the rack the construction is simplified and a very compact form of scale is made and the cylinders are wholly inclosed within the case, where they are protected from dust, which would be liable to clog the pistons and effect the weight.

I claim as my invention—

1. In a computing-scale, the combination of the indicating-cylinder with an air-cylinder and piston, a piston-rod and connecting devices between the said piston-rod and indicating-cylinder, the said piston-rod consisting of a long resilient member having numerous portions thereof extending transversely to the longitudinal direction of the said cylinder, upon which piston-rod the piston is mounted, whereby the piston-rod readily yields to a light pressure both longitudinally and laterally, substantially as described.

2. In a computing-scale, the combination of the indicating-cylinder with an air-cylinder and piston, a resilient piston-rod in the form of a spiral spring upon which the piston is mounted, and connecting devices between the said piston-rod and indicating-cylinder, substantially as described.

3. In a computing-scale, the combination of a frame, the cylinder-shaft mounted by its middle portion within the said frame, the indicating-cylinder in two sections one at each end of the said shaft and extending beyond the said frame, the pinion on the middle portion of the said cylinder-shaft between the two sections of the said cylinder, a rack engaging the said pinion, the springs operatively connected with the said rack, the air-cylinders connected with the said frame, and the pistons within the said cylinders, operatively connected with the said rack, the said air-cylinders, pistons and springs also being located within the said frame between the said sections of the said indicating-cylinder, substantially as described.

4. In a computing-scale, the combination of the frame having a surrounding rim provided with flat-bottomed recesses and open slots and having also a transverse web, the cylinder-shaft and pinion mounted on the said transverse web, the draw-bar having a cross-head, the rack connected with the said draw-bar and engaging the said pinion, and balancing-springs and air-cylinders, the upper ends of the said springs and cylinders supported by nuts in the said recesses of the said rim and the lower ends of the said balancing-springs being connected to the said cross-head substantially as described.

5. In a computing-scale, the combination of the cylinder-shaft 10, with the tube or collar 11 secured thereon, the pinion rigidly mounted on the middle portion of the said tube or collar, and the separately-formed rings or cones also rigidly mounted on the said tube or collar for rotating therewith, one at each end of the said pinion, substantially as described.

SAMUEL R. MUNSON.

Witnesses:
A. C. TYLER,
F. T. PUNDERSON.